(12) United States Patent
Shiraishi

(10) Patent No.: US 10,103,360 B2
(45) Date of Patent: Oct. 16, 2018

(54) BATTERY MODULE AND METHOD OF MANUFACTURING SAME

(71) Applicant: NEC ENERGY DEVICES, LTD., Sagamihara-shi, Kanagawa (JP)

(72) Inventor: Shoichiro Shiraishi, Kanagawa (JP)

(73) Assignee: NEC ENERGY DEVICES, LTD., Sagamihara-shi, Kanagawa (JP)

(*) Notice: Subject to any disclaimer, the term of this patent is extended or adjusted under 35 U.S.C. 154(b) by 355 days.

(21) Appl. No.: 14/775,783

(22) PCT Filed: Feb. 5, 2014

(86) PCT No.: PCT/JP2014/052661
§ 371 (c)(1),
(2) Date: Sep. 14, 2015

(87) PCT Pub. No.: WO2014/141779
PCT Pub. Date: Sep. 18, 2014

(65) Prior Publication Data
US 2016/0028050 A1    Jan. 28, 2016

(30) Foreign Application Priority Data
Mar. 15, 2013   (JP) ................... 2013-053388

(51) Int. Cl.
*H01M 2/02* (2006.01)
*H01M 2/10* (2006.01)
*H01M 4/70* (2006.01)

(52) U.S. Cl.
CPC ......... *H01M 2/0207* (2013.01); *H01M 2/024* (2013.01); *H01M 2/1061* (2013.01); *H01M 4/70* (2013.01)

(58) Field of Classification Search
None
See application file for complete search history.

(56) References Cited

U.S. PATENT DOCUMENTS

2003/0146734 A1   8/2003  Kozu et al.
2008/0057392 A1*  3/2008  Takamatsu .......... H01M 2/1061
                                           429/154
(Continued)

FOREIGN PATENT DOCUMENTS

JP    2001-256938 A    9/2001
JP    2004-103368 A    4/2004
(Continued)

OTHER PUBLICATIONS

International Search Report of PCT/JP2014/052661 dated Mar. 11, 2014 [PCT/ISA/210].

*Primary Examiner* — Rena Dye Cronin
(74) *Attorney, Agent, or Firm* — Sughrue Mion, PLLC

(57) ABSTRACT

The present invention includes a battery cell, and a module case that contains the battery cell. The battery cell is formed in a flat shape in which a laminate current collector in which a positive current collector and a negative current collector are laminated or wound with a separator interposed therebetween, and an electrolytic solution are contained in a packaging body. The module case includes a deformation part swelling toward a principal surface side of the battery cell, at a position that faces the principal surface of the battery cell in the flat shape, and the deformation part is formed so as to be able to swell toward the outside of the module case when the battery cell expands.

1 Claim, 8 Drawing Sheets

(56) References Cited

U.S. PATENT DOCUMENTS

2008/0145747 A1\* 6/2008 Wu .................... H01M 2/0202
429/56
2011/0135997 A1 6/2011 Watanabe et al.

FOREIGN PATENT DOCUMENTS

| JP | 2004-356027 A | 12/2004 |
|----|---------------|---------|
| JP | 2007-173030 A | 7/2007 |
| JP | 2012-119232 A | 6/2012 |
| WO | 2010/089813 A1 | 8/2010 |

\* cited by examiner (A-A)

(A-A)

(B-B)

BATTERY MODULE AND METHOD OF MANUFACTURING SAME

CROSS REFERENCE TO RELATED APPLICATIONS

This application is a National Stage of International Application No. PCT/JP2014/052661, filed Feb. 5, 2014, claiming priority based on Japanese Patent Application No. 2013-053388, filed Mar. 15, 2013, the contents of all of which are incorporated herein by reference in their entirety.

TECHNICAL FIELD

The present invention relates to a battery module in which a battery cell is contained in a module case, and a method of manufacturing the same.

BACKGROUND ART

There is known a battery cell configured such that a positive electrode and a negative electrode are laminated with a separator interposed therebetween. As a battery module including this kind of battery cell, there is known a battery module in which the battery cell is contained in a module case for protecting the battery cell.

By the way, in the battery module, when an internal short-circuit occurs in the battery cell, gas is generated in the battery cell, and the internal pressure of the battery cell rises. When the internal pressure rises, the battery cell expands in the thickness direction of the battery cell, which is the direction in which the positive and negative electrodes are laminated with the separator disposed therebetween. In cases where the above described battery cell, which is contained in the module case, is unable to expand, there is a gradual increase in the cell's internal current, which results in the generation of heat and the battery cell is consequently ruptured.

As a measure to enable a battery cell to expand, Patent Document 1 discloses a configuration in which a deformation member for facilitating the expansion of the battery cell is disposed in a module case containing battery cells.

The module case included in the battery module described in Patent Document 1 contains the deformation member, together with the battery cells. The module case is configured so as to allow expansion and to press the battery cell which expands, by the deformation member. When the deformation member is pressurized at a pressure which is a predetermined value or less, it elastically deforms, and when it is pressurized at a pressure which is more than the predetermined value, it does not deform anymore.

LIST OF RELATED ART DOCUMENT

Patent Document

Patent Document 1: JP2007-173030A

SUMMARY OF INVENTION

Problems to be Solved by Invention

However, in the configuration described in Patent Document 1, there is a problem in that the structure for disposing the deformation member in the module case is complex and the production cost increases.

Hence, the present invention has an object to provide a battery module and a method of manufacturing the same that make it possible to solve the problem of the above related art. An example of the object of the present invention is to provide a battery module and a method of manufacturing the same that, by using a simple configuration that enables deformation without preventing expansion of the battery cell, when the internal short circuiting occurs in the battery cells and that can enhance the safety.

Means to Solve the Problems

To realize the above-described object, a battery module according to the present invention includes a battery cell, and a module case that contains the battery cell. The battery cell is formed in a flat shape while the battery assembly in which a positive electrode and a negative electrode are laminated or wound with a separator interposed therebetween, and electrolyte are contained in a packaging body. Then, the module case includes a deformation part swelling toward the principal surface side of the battery cell, at a position that faces the principal surface of the battery cell in the flat shape, and the deformation part is formed so as to be able to swell toward the outside of the module case when the battery cell expands.

Further, a method of manufacturing a battery module according to the present invention is a method of manufacturing a battery module including a battery cell and a module case that contains the battery cell, the battery cell being formed in a flat shape while a battery assembly and electrolyte are contained in a packaging body, the battery assembly being a battery assembly in which a positive electrode and a negative electrode are laminated or wound with a separator interposed therebetween, the method comprising the step of forming a deformation part at a position that is on said module case and that faces the principal surface of the battery cell in the flat shape, the deformation part swelling toward the principal surface side of the battery cell, the deformation part being able to swell toward the outside of the module case when the battery cell expands.

Effects of Invention

According to the present invention, when an internal short-circuit occurs in the battery cell, the deformation part of the module case deforms without preventing expansion of the battery cell. Therefore, through the use of a simple configuration, an increase in the internal current of the battery cell can be prevented, and thus battery safety can be enhanced.

DESCRIPTION OF EXEMPLARY EMBODIMENTS

Hereinafter, specific exemplary embodiments of the present invention will be described with reference to the drawings.

(First Exemplary Embodiment)

Figure 1A:
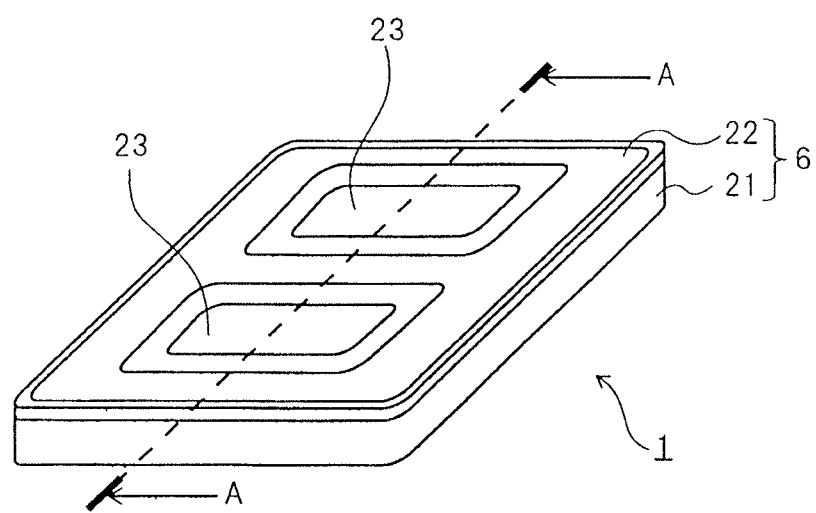
FIG. 1A is a perspective view showing a battery module according to a first exemplary embodiment.
Figure 1B:
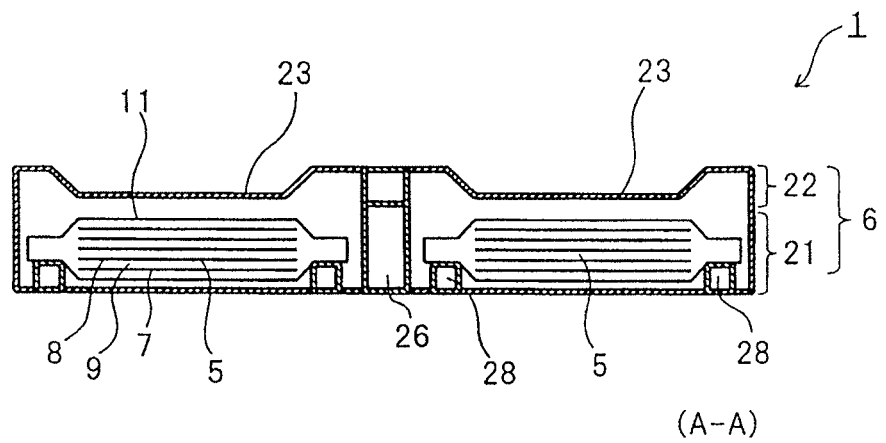
FIG. 1B is a cross-section view showing the battery module according to the first exemplary embodiment.
Figure 1C:
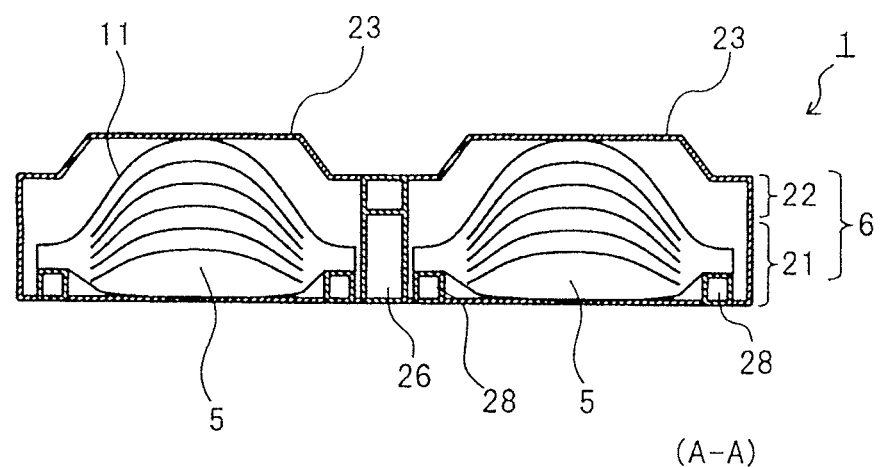
FIG. 1C is a cross-section view showing a state in which the battery module according to the first exemplary embodiment has deformed.
Figure 2A:
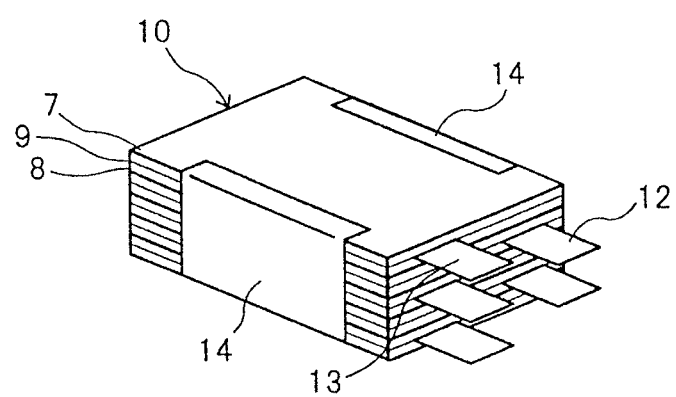
FIG. 2A is a schematic view for describing a battery cell in the battery module according to the first exemplary embodiment.
Figure 2B:
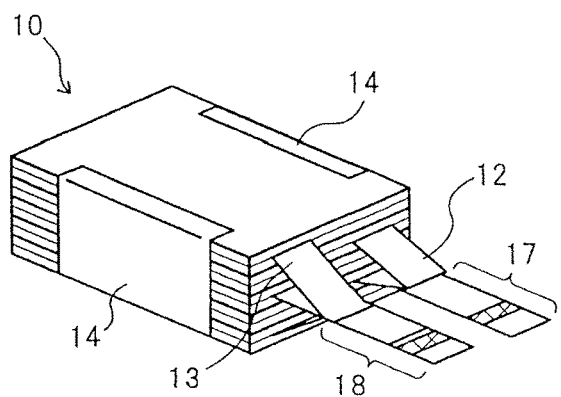
FIG. 2B is a schematic view for describing the battery cell in the battery module according to the first exemplary embodiment.
Figure 3A:
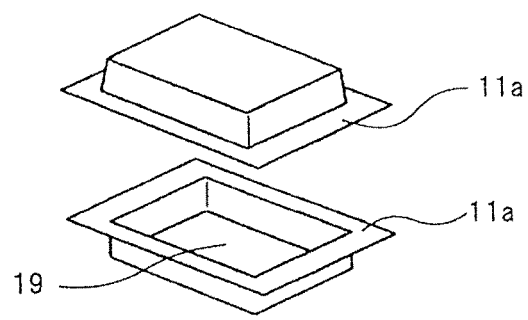
FIG. 3A is a schematic view for describing a packaging body of the battery cell in the battery module according to the first exemplary embodiment.
Figure 3B:
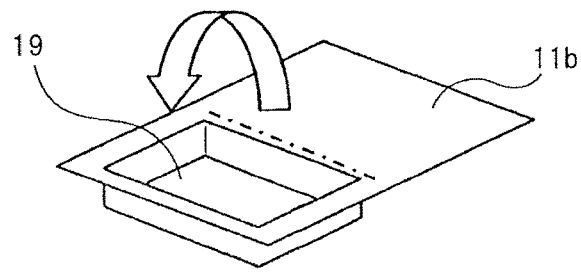
FIG. 3B is a schematic view for describing a packaging body of the battery cell in the battery module according to the first exemplary embodiment.
Figure 3C:
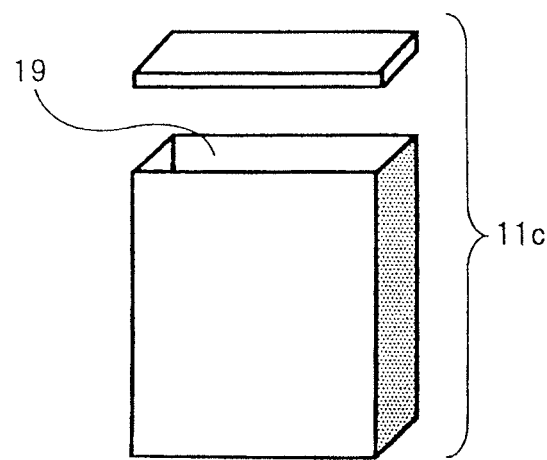
FIG. 3C is a schematic view for describing a packaging body of the battery cell in the battery module according to the first exemplary embodiment.

FIG. 1A shows a perspective view of a battery module according to a first exemplary embodiment. FIG. 1B shows a cross-section view of the battery module according to the first exemplary embodiment. FIG. 1C shows a cross-section view in a state in which the battery module according to the first exemplary embodiment has deformed. FIG. 2A and FIG. 2B show schematic views of a battery cell in the battery module according to the first exemplary embodiment. FIG. 3A to FIG. 3C are schematic views of packaging bodies of the battery cell in the battery module according to the first exemplary embodiment.

As shown in FIG. 1A and FIG. 1B, battery module 1 according to the first exemplary embodiment includes battery cells 5, and module case 6 that internally contains battery cells 5. The exemplary embodiment shows module case 6 that contains two battery cells 5, but an assembled battery may be contained in module case 6 instead of battery cells 5. For convenience of description, the description of a configuration in which one battery cell or assembled battery is contained in the module case is omitted.

Battery cell 5 includes positive current collectors 7 as positive electrodes, negative current collectors 8 as negative electrodes, and separators 9 provided between positive current collectors 7 and negative current collectors 8, and includes laminated body 10 of the current collectors as a battery assembly in which positive current collectors 7 and negative current collectors 8 are laminated with separators 9 interposed therebetween. Battery cell 5 is formed in a flat shape while laminated body 10 that contains the current collectors and an electrolytic solution (not illustrated) as an electrolyte are contained in packaging body 11. Here, in the present invention, for convenience sake, a portion where positive current collectors 7 and negative current collectors 8 are laminated with separators 9 interposed therebetween and where positive current collecting tab 12 and negative current collecting tab 13 described later are removed is referred to as a battery assembly.

Positive current collector 7 is formed by applying a positive electrode mixture to both surfaces of a zonal aluminum current collector. Negative current collector 8 is formed by applying a negative electrode mixture to both surfaces of a zonal copper current collector.

Further, positive current collecting tab 12 is integrated with positive current collector 7, and negative current collecting tab 13 is integrated with negative current collector 8. In positive current collecting tab 12, one end is electrically connected with positive current collector 7, and the other end is removed from packaging body 11. Similarly, in negative current collecting tab 13, one end is electrically connected to negative current collector 8, and the other end is removed from packaging body 11.

In the step of forming positive current collector 7, although not illustrated, the zonal current collector fed from an unwinding roll is wound by a winding roll, and therewith, the positive electrode mixture is applied to the current collector fed from the unwinding roll. On this occasion, an application part where the positive electrode mixture is applied and a non-application part where the positive electrode mixture is not applied are formed alternately in the longitudinal direction of the zonal current collector. Then, a portion of the non-application part, together with the application part, is stamped out by press working, and thereby, the portion of the non-application part is formed as the positive current collecting tab. Further, the step of forming the negative current collector is the same as the step of forming the positive current collector, and therefore, the description is omitted.

Positive current collecting tab 12 and negative current collecting tab 13 are not limited to the configuration in which each is removed from one end side of packaging body 11, and needless to say, they may be configured such that the positive current collecting tab is removed from one of both opposite ends of packaging body 11 and the negative current collecting tab is removed from the other.

In laminated body 10 of the current collectors, as shown in FIG. 2A, on the lateral faces where positive current collecting tab 12 and negative current collecting tab 13 are not removed, electrode current collectors 7, 8 and separators 9 are bundled and fixed by fixation tape 14, and the deviation of the relative position of electrode current collectors 7, 8 and separators 9 is prevented.

As shown in FIG. 2B, positive current collecting tabs 12 that are removed from one end of laminated body 10 of the current collectors are bundled and are connected with positive electrode terminal 17. Similarly, negative current collecting tabs 13 are bundled and are connected with negative electrode terminal 18. Further, current collecting tabs 12, 13 may be connected with terminals 17, 18 through a conductive complementary member.

Separator 9 is formed of a polyolefin-based resin material. Further, separator 9 may be formed in a bag shape allowing for the insertion of the portion of positive current collector 7 except positive current collecting tab 12. Bag-shape separator 9 is formed by laminating two quadrangular separators 9 one on the other and performing a heat seal of three sides of the circumferential portions of two separators 9. Further, in the case of the configuration in which positive current collector 7 is inserted into bag-shape separator 9, it is possible to steady the relative position of positive current collector 7 and negative current collector 8 in the in-plane direction of the primary surface of positive current collector 7, in laminated body 10 that contains the current collectors, by forming the external dimensions of the primary surface of negative current collector 8 such that they are equal to the external dimensions of the primary surface of separator 9 and stacking negative current collector 8 on separator 9.

It is preferable that packaging body 11 be formed of a flexible material such as a deformable aluminum sheet, to facilitate the deformation of laminated body 10 of the current collectors. As shown in FIG. 3A, packaging body 11 is configured by combining a set of packaging members 11a so as to configure containing part 19 in which laminated body 10 of the current collectors is contained. Further, as shown in FIG. 3B, packaging body 11 may be configured so as to close the opening of containing part 19 by folding back one end of packaging member 11b including containing part 19. Furthermore, needless to say, as shown in FIG. 3C, packaging body 11 may be formed as so-called rectangular battery can 11c that is formed in a box shape including containing part 19.

Figure 4:
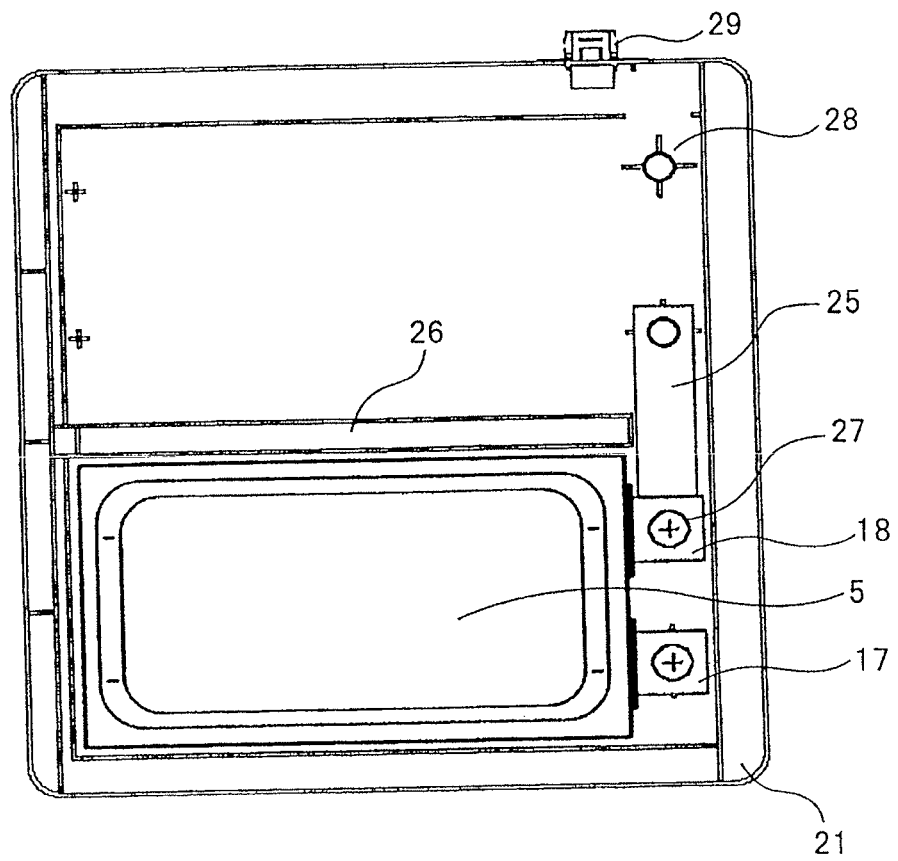
FIG. 4 is a plan view showing a case part of a module case in the first exemplary embodiment.
Figure 5:
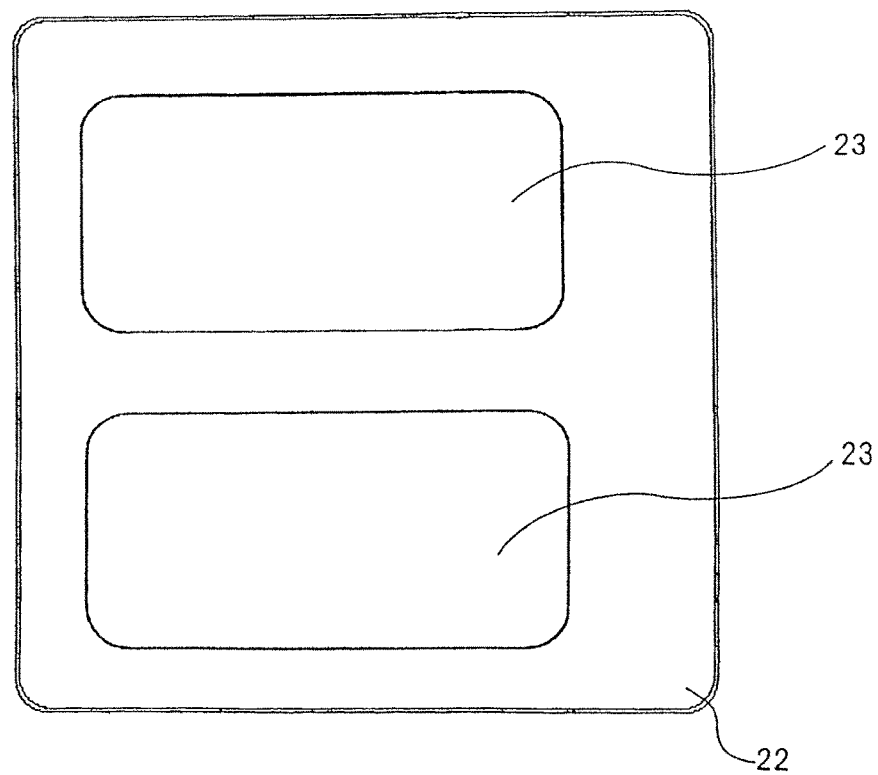
FIG. 5 is a plan view showing a cover part of the module case in the first exemplary embodiment.

FIG. 4 shows a plan view of case part 21 of module case 6 in the first exemplary embodiment. FIG. 5 shows a plan view of cover part 22 of module case 6 in the first exemplary embodiment.

As shown in FIG. 1A, module case 6, which is the principal part of the exemplary embodiment, is formed of a resin material, and includes case part 21 that contains battery cell 5, and cover part 22 that covers one primary surface of battery cell 5.

As shown in FIG. 1A and FIG. 4, case part 21 is formed in a box shape including an opening, and the opening is closed by the attachment of cover part 22. On an identical surface that is the bottom surface of case part 21, two battery cells 5 are arrayed and disposed across partition wall 26 formed on the bottom surface. Further, in case part 21, receiving parts 28 for fastening screws 27 to fix battery cell 5 are formed.

Further, as shown in FIG. 4, on the bottom surface of case part 21, bus bar 25 for electrically connecting battery cells 5 with each other is provided. Further, in case part 21, wires (not illustrated) that are connected with the terminals of battery cells 5 and that are taken out of module case 6, and connector 29 are provided.

As shown in FIG. 1B and FIG. 5, on cover part 22, deformation parts 23 swelling toward the primary surfaces of battery cells 5 are provided at positions that face the primary surfaces of battery cells 5. That is, deformation parts 23 are formed at positions corresponding to portions where the expansions that will occur in flat-shape battery cells 5 are relatively great.

As shown in FIG. 1C, deformation part 23 is formed so as to be able to swell toward the outside of module case 6 when battery cell 5 expands. Deformation part 23 is formed in a quadrangular concave shape corresponding to the external shape of battery cell 5, and is formed such that the external dimensions of deformation part 23 are nearly equal to the external dimensions of battery cell 5.

Here, in the exemplary embodiment, a predetermined gap is provided between the inner surface of deformation part 23 and the primary surface of battery cell 5, but as necessary, the inner surface of deformation part 23 may come into contact with the primary surface of battery cell 5. When the inner surface of deformation part 23 of cover part 22 comes into contact with packaging body 11 of battery cell 5, battery cell 5 is further stably supported by module case 6.

Figure 6:
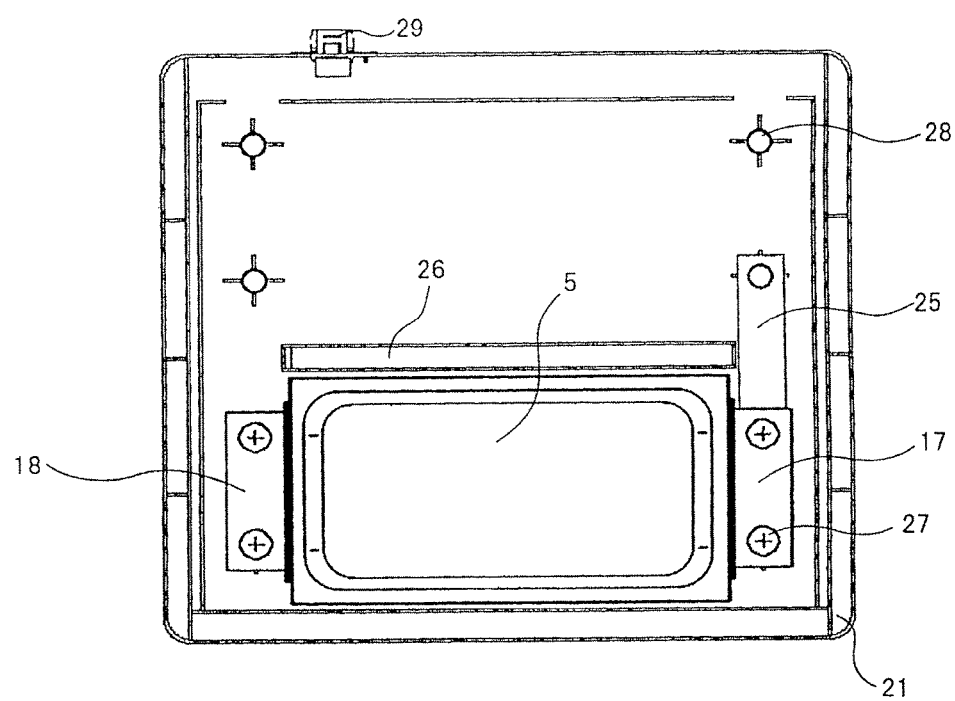
FIG. 6 is a plan view showing another exemplary configuration of the case part of the module case.
Figure 7:
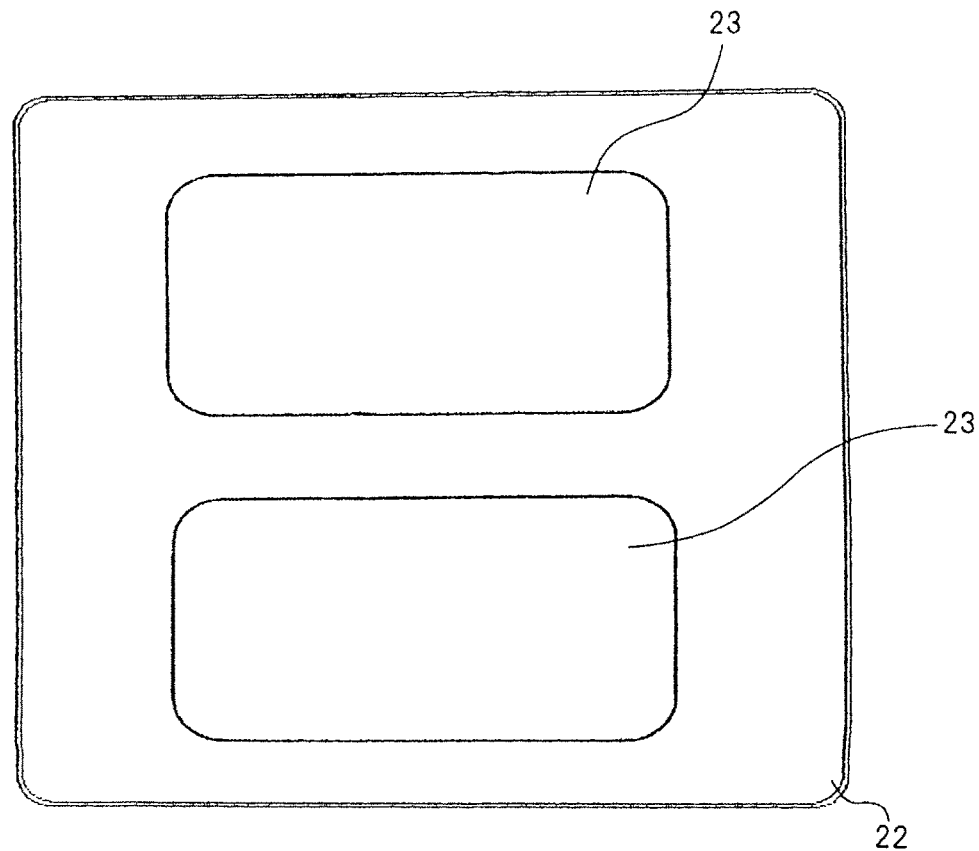
FIG. 7 is a plan view showing another exemplary configuration of the cover part of the module case.

FIG. 6 shows a plan view of another exemplary configuration of the case part of module case 6. FIG. 7 shows a plan view of another exemplary configuration of the cover part of module case 6.

Further, in the case of a configuration that uses a battery cell in which positive electrode terminal 17 and negative electrode terminal 18 are removed from both ends respectively, as shown in FIG. 6, spaces for disposing bus bar 25 are provided at both end sides of battery cell 5 in case part 21 of module case 6. Also in the case of this configuration, as shown in FIG. 7, on cover part 22 of module case 6, deformation parts 23 are formed corresponding to the positions of the primary surfaces of battery cells 5 disposed in case part 21.

Further, in the exemplary embodiment, battery cell 5 is fixed on the bottom surface of case part 21, but, without being limited to this configuration, as necessary, battery cell 5 may be fixed on the side of cover part 22 by fastening screws.

Further, although not illustrated, an assembled battery in which battery cells 5 are laminated and united may be configured, and the assembled battery may be contained in module case 6. In the case of this configuration, laminated battery cells 5 are bundled and fixed by a fixation tape.

As for battery module 1 configured as described above, the action of deformation part 23 when an internal short-circuit occurs in battery cell 5 will be described.

As shown in FIG. 1C, when an internal short-circuit occurs in battery cell 5 within module case 6, packaging body 11 expands toward the outside of battery cell 5, due to the gas that is generated in packaging body 11. When the primary surface of battery cell 5 expands in this way, battery cell 5 presses against deformation part 23, and deformation part 23 swells toward the outside of module case 6.

Since deformation part 23 deforms in response to the expansion of battery cell 5, module case 6 does not prevent the expansion of battery cell 5, and the resistance between the electrodes increases with the deformation of positive current collector 7 and negative current collector 8. Therefore, when an internal short-circuit occurs in battery cell 5, the rise in the internal current is prevented.

As described above, in battery module 1 according to the exemplary embodiment, since module case 6 includes deformation part 23, deformation part 23 deforms toward the outside of module case 6, when an internal short-circuit occurs in battery cell 5. Therefore, the resistance between the electrodes increases, and an increase in the internal current can be prevented. As a result, by using the simple configuration, it is possible to enhance the safety of battery module 1.

Further, compared to the configuration described in Patent Document 1, in the exemplary embodiment, by using the simple configuration in which deformation part 23 is shaped on module case 6, it is possible to allow expansion of battery cells 5, and to suppress the increase in the production cost of battery module 1.

In addition, compared to the configuration in which a deformation member for allowing swelling of the battery cell is provided in the interior of the module case as the above-described Patent Document 1 and compared to the configuration in which a space for allowing expansion of the battery cell is secured in the interior of the module case, in the exemplary embodiment, it is possible to make the whole of module case 6 thinner, in the normal state of battery cell 5.

Further, in battery module 1, even when battery cell 5 expands greatly, only deformation part 23 of module case 6 deforms, and it is possible to prevent the adverse effect on the other normal battery cell 5 that is contained in module case 6.

Further, battery module 1 also has the advantage that it is possible to easily form deformation part 23 that is suitable for use in battery cell 5 to be used, by appropriately regulating the size of deformation part 23 and the displacement of deformation part 23 that is to be deformed depending on the size and the displacement of battery cell 5 that is to be deformed.

(Second Exemplary Embodiment)

Figure 8A:
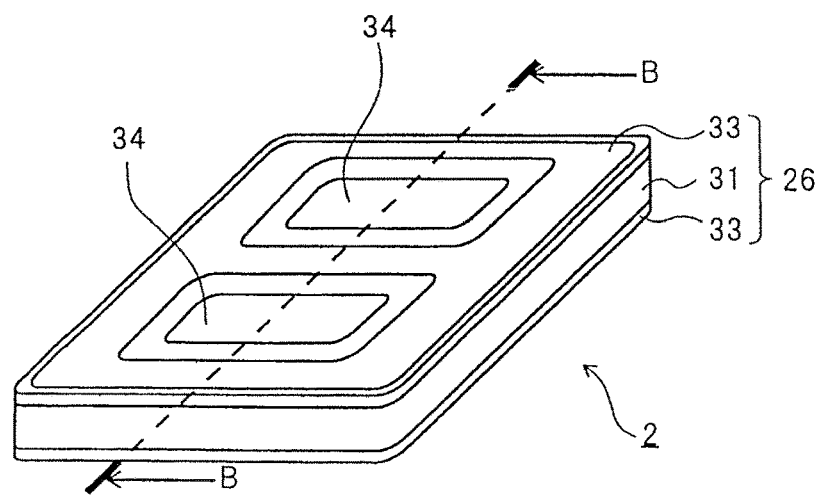
FIG. 8A is a perspective view showing a battery module according to a second exemplary embodiment.

FIG. 8A shows a perspective view of a battery module according to a second exemplary embodiment. FIG. 8C shows a cross-section of the battery module according to the second exemplary embodiment. A battery cell in the second exemplary embodiment is the same as battery cell 5 in the first exemplary embodiment, and therefore, the description of battery cell 5 is omitted. Further, in the second exemplary embodiment, the same constituent members as the above-described exemplary embodiment are briefly described.

Battery module 2 according to the second exemplary embodiment, in which battery cells 5 are disposed on both surface sides of the module case respectively, is different from the first exemplary embodiment, in that deformation parts are provided on both surfaces of the module case.

Figure 8B:
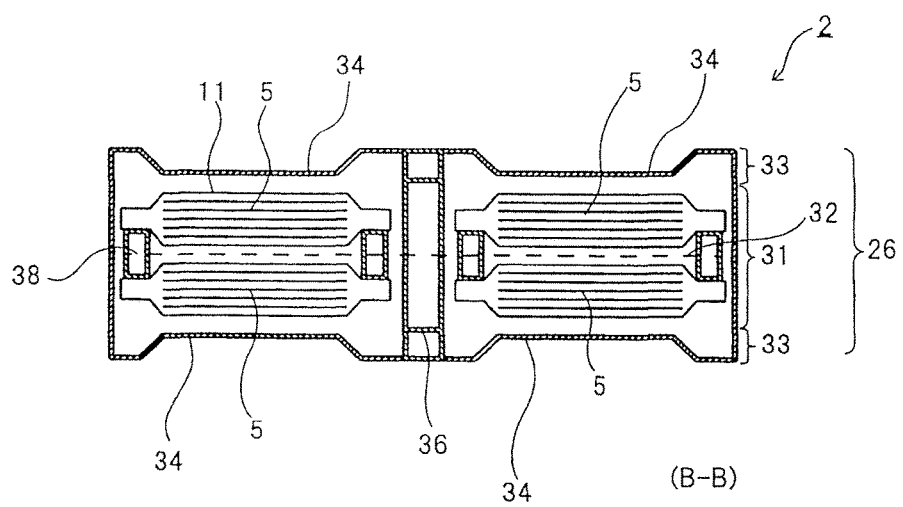
FIG. 8B is a cross-section view showing the battery module according to the second exemplary embodiment.

As shown in FIG. 8A and FIG. 8B, module case 26 included in battery module 2 according to the second exemplary embodiment includes case part 31 for containing battery cells 5, board part 32 on which battery cells 5 are fixed, and a set of cover parts 33 that cover the primary surfaces of battery cells 5 fixed on board part 32.

Case part 31 is formed in a rectangular cylindrical shape in which both sides are opened, and in the interior, board part 32 is fixed.

As shown in FIG. 8B, board part 32 is formed in a flat plate shape, and battery cells 5 are disposed on the front surface and the back surface of board part 32. On an identical surface that is the front surface of board part 32, two battery cells 5 are arrayed and disposed across partition wall 36. Further, on the back surface of board part 32, similarly to the front surface, two battery cells 5 are arrayed and disposed across partition wall 36.

Further, the circumferential portion of board part 32 is fixed on the inner surface of case part 31, and receiving parts 38 for fastening screws (not illustrated) to fix battery cell 5 are formed.

Deformation parts 34 are formed at positions on cover parts 33 that face the primary surfaces of two battery cells 5 fixed on board part 32.

Here, the structure of the deformation part of the module case is not limited to the structure shown in the above-described exemplary embodiment. The deformation part of the module case may be formed, in a stepped shape in which steps are concentrically formed, in a shape in which a step at the center of the primary surface of the battery cell, where the displacement amount tends to become relatively great, is formed so as to be large and steps are formed so as to decrease gradually toward the circumferential side of the battery cell, or in a bellows shape including pleated fold portions. Thereby, it is possible to obtain the same effect as the exemplary embodiment.

Further, to ensure that only the deformation part will easily deform, the cover part may be formed such that the thickness of the deformation part is thinner than the portion around the deformation part. Further, the deformation part may be formed such that a replication portion which is replicated at the time of the deformation is thinner than the other portion of the deformation part, or may be formed such that the thickness of the deformation part varies stepwise.

Further, the shape and thickness of the deformation part that is to swell toward the primary surface side of the battery cell may be appropriately set depending on the shape of the battery cell contained in the module case, the region where the expansion occurs, or the magnitude of displacement of the battery cell that is to be deformed, and a groove for promoting the deformation may be formed on the inner surface or the like of the deformation part. Further, the deformation parts may be disposed on the cover part of the module case so as to be dispersed in a predetermined region, corresponding to the primary surface of one battery cell.

In the above-described exemplary embodiment, the deformation part is integrated with the cover part, but as necessary, the deformation part may be formed of a less rigid material than the other portion of the cover part. Further, the deformation part may be configured such that the deformation part deforms toward the outside of the module case and therewith breaks away from the cover part when a predetermined pressure or more is applied.

Here, in the battery module according to the above-described exemplary embodiment, the battery cell having a laminate structure is used, but the structure of the battery cell is not limited, and needless to say, a battery cell having a wound structure in which the positive current collector and the negative current collector are spirally wound with a separator interposed therebetween may be used.

REFERENCE NUMERAL 1 battery module
5 battery cell
6 module case
7 positive current collector
8 negative current collector
9 separator
10 laminated body of current collectors
11 packaging body
23 deformation part

The invention claimed is:

1. A battery module comprising:
   a battery cell; and
   a module case that contains the battery cell, wherein:
   said battery cell is formed in a flat shape in which a battery assembly and electrolyte are contained in a packaging body, the battery assembly having a positive electrode and a negative electrode which are laminated or wound with a separator interposed therebetween,
   said module case includes a deformation part at a position that faces a principal surface of said battery cell in the flat shape, said deformation part being angled inward or protruding toward the principal surface of said battery cell,
   said deformation part is formed so as to be able to swell toward an outside of said module case when said battery cell expands,
   said module case contains a plurality of said battery cells, and
   at least two battery cells are disposed in said module case so as to be arrayed on an identical surface, wherein:
   said module case includes:
     a case part that contains said battery cells;
     a board part that is provided in the case part and on which said battery cells are fixed; and
     a set of cover parts that are attached to said case part and that are disposed so as to cover a front and a back of said board part respectively,
   said battery cells are disposed on front and back surfaces of said board part, and said deformation part is formed on each of said set of cover parts.

* * * * *